United States Patent
Sugizaki

(10) Patent No.: US 7,929,030 B2
(45) Date of Patent: Apr. 19, 2011

(54) DEVICE, METHOD, AND PROGRAM STORAGE MEDIUM TO PERFORM DEFECTIVE PIXEL CORRECTION ON AN IMAGE

(75) Inventor: Makoto Sugizaki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 510 days.

(21) Appl. No.: 12/073,590

(22) Filed: Mar. 7, 2008

(65) Prior Publication Data

US 2008/0239115 A1  Oct. 2, 2008

(30) Foreign Application Priority Data

Mar. 30, 2007  (JP) ............... 2007-091689

(51) Int. Cl.
*H04N 5/217* (2006.01)
*H04N 9/64* (2006.01)

(52) U.S. Cl. ............ 348/241; 348/247
(58) Field of Classification Search .......... 348/241, 348/246, 247
See application file for complete search history.

(56) References Cited

U.S. PATENT DOCUMENTS

| | | | | |
|---|---|---|---|---|
| 5,790,694 A | * | 8/1998 | Maruo | 382/149 |
| 6,529,618 B1 | * | 3/2003 | Ohara et al. | 382/132 |
| 6,985,180 B2 | * | 1/2006 | Chang et al. | 348/246 |
| 7,362,916 B2 | * | 4/2008 | Yamazaki | 382/275 |

FOREIGN PATENT DOCUMENTS

| | | | | |
|---|---|---|---|---|
| JP | A 2001-008198 | | | 1/2001 |
| JP | 2004294202 A | * | | 10/2004 |
| JP | 2005167773 A | * | | 6/2005 |
| JP | A 2005-167773 | | | 6/2005 |

* cited by examiner

*Primary Examiner* — Timothy J Henn
(74) *Attorney, Agent, or Firm* — Sheldon J. Moss; Chad M. Herring

(57) ABSTRACT

There is a provided an image processing device having: a storage section for storing defective pixel information expressing defective pixels of an image pickup element; a correction section that, on the basis of the defective pixel information, carries out correction of defective pixels on an image captured by the image pickup element; a point defect detector that, on the basis of a first image for defect detection which has not been subjected to defective pixel correction, detects point defects of the image pickup element in accordance with point defect detecting conditions; a line defect detector that, on the basis of a second image for defect detection which has not been subjected to defective pixel correction, detects line defects of the image pickup element in accordance with line defect detecting conditions; and a defective pixel information register storing the results of detection.

13 Claims, 6 Drawing Sheets

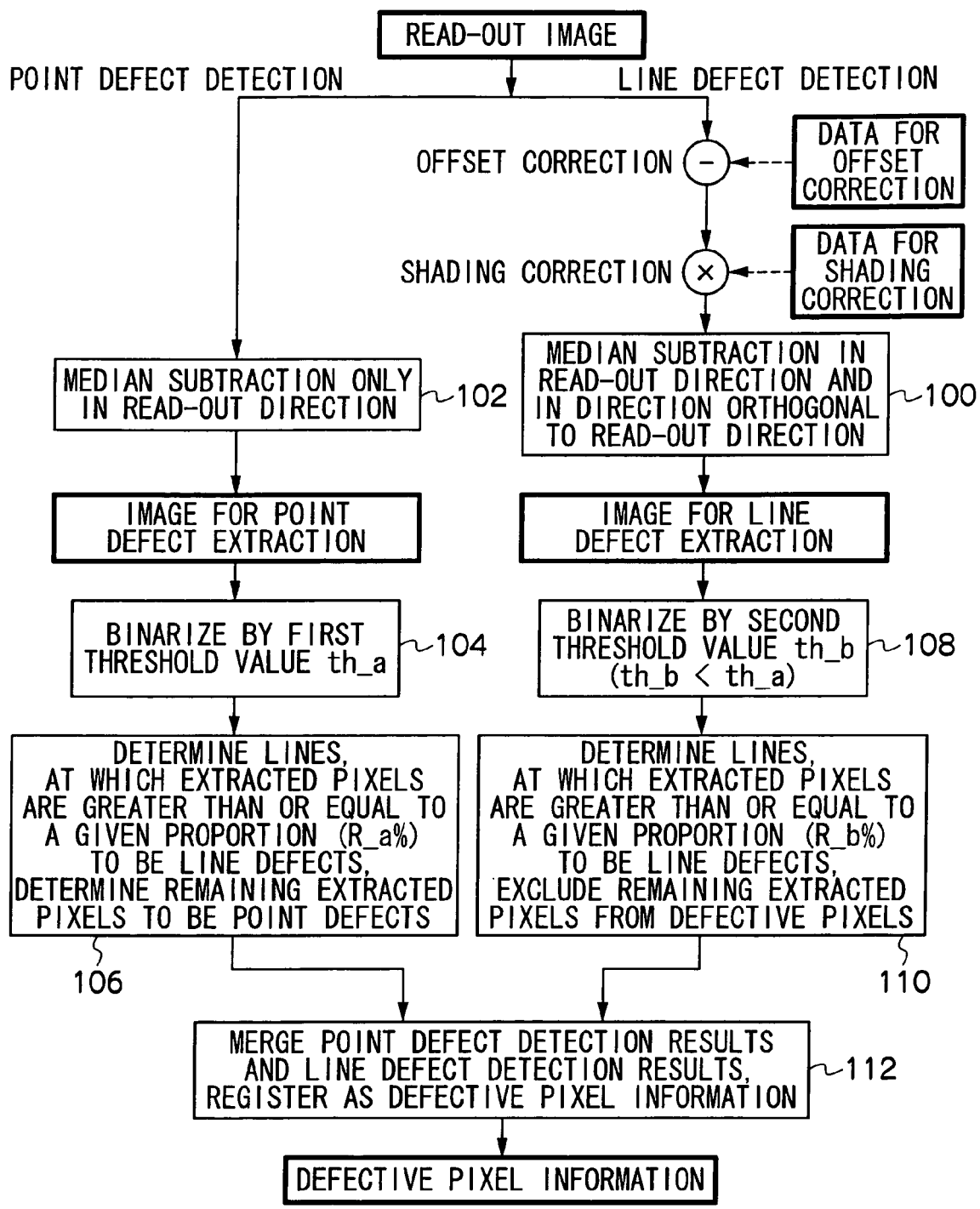

DEVICE, METHOD, AND PROGRAM STORAGE MEDIUM TO PERFORM DEFECTIVE PIXEL CORRECTION ON AN IMAGE

CROSS-REFERENCE TO RELATED APPLICATION

This application claims priority under 35 USC 119 from Japanese Patent Application No. 2007-091689, the disclosure of which is incorporated by reference herein.

BACKGROUND OF THE INVENTION

1. Field of the Invention

The present invention relates to an image processing device, method, and program storage medium. In particular, the present invention relates to an image processing device which carries out correction of defective pixels on an image picked-up (captured) by an image pickup element, and to an image processing method which can be applied to the image processing device, and to an image processing program storage medium for causing a computer to execute the image processing.

2. Description of the Related Art

In radiation photography for medical diagnosis, there is known a system which obtains digital radiographic images as follows: radiation which has been transmitted through a subject is irradiated onto a radiographic image detector equipped with a photoelectric converting layer which is sensitive to radiation, the charges which are accumulated at the radiographic image detector in accordance with the radiation dose irradiated onto the radiographic image detector are read-out per pixel as electrical signals, and the read-out electrical signals are converted into digital data. In radiographic image detectors of this type of system, there are cases in which pixels at which output corresponding to the irradiated radiation dose cannot be obtained (called "defective pixels") arise due to, for example, deterioration due to the irradiation of the radiation, poor contact of electrical wires, or the like. Therefore, defective pixels of a radiographic image detector are detected in advance, and defective pixel correction, which corrects the luminance or density of the image portions corresponding to the defective pixels on the basis of the results of detection of the defective pixels, is carried out on the radiographic image obtained by the radiation photography.

In relation to the above-described defective pixel correction, Japanese Patent Application Laid-Open (JP-A) No. 2001-8198 discloses a technique in which the average and the standard deviation of the pixel values of the entire image region or an arbitrary region of image information are computed, and, for each pixel of the image information, it is determined whether or not the absolute value of the difference between an object pixel value and the average is greater than the results of multiplication of the standard deviation and a magnification designated in advance, and, if greater, the object pixel is determined to be a defective pixel.

Further, JP-A No. 2005-167773 discloses a technique in which line defects are extracted from an image for defect extraction, and the line defects of the image for defect extraction are corrected by using the extracted line defect information, and either defective pixels are extracted by using the corrected image for defect extraction, or pixel defects are extracted without using the pixel values corresponding to the extracted line defects.

Pixel defects of an image pickup element such as a radiographic image detector can be broadly classified into pixel defects which are formed by a single or a small number of defective pixels being distributed in dot form (called "point defects"), and pixels defects which are formed by plural defective pixels being distributed rectilinearly (called "line defects"). Note that point defects arise mainly due to deterioration due to the irradiation of radiation, whereas line defects arise mainly due to poor contact of electrical wires. Further, as compared with point defects, line defects are easy to recognize visually even if the difference in luminance or the like between them and the surrounding pixels is small.

In regard to this point, in the technique of JP-A No. 2001-8198, when detecting (extracting) pixel defects, detection is carried out without differentiating between the aforementioned point defects and line defects. Therefore, in the technique of JP-A No. 2001-8198, when the threshold value for detection is set such that line defects, which are easily visually recognized, can be reliably detected, at regions other than the pixel defects of the radiographic image detector, noise which is superimposed on the radiographic image also is detected as point defects. Accordingly, the accuracy of detecting and correcting pixel defects deteriorates.

On the other hand, in the technique of JP-A No. 2005-167773, after line defects are detected, detection of point defects is carried out by using an image in which the detected line defects are corrected. Therefore, much time is required until the detection of point defects and line defects is completed. Further, in the technique of JP-A No. 2005-167773, processing becomes complex in a case in which point defects are detected without using the pixel values corresponding to the detected line defects.

SUMMARY OF THE INVENTION

The present invention has been made in view of the above circumstances, and provides an image processing device, an image processing method, and a storage medium storing an image processing program, which can accurately and in a short time detect and correct point defects and line defects of an image pickup element.

A first aspect of the present invention is an image processing device including: a storage section that stores defective pixel information expressing defective pixels of an image pickup element; a correction section that, on the basis of the defective pixel information, performs correction of defective pixels on an image captured by the image pickup element; a point defect detector that, on the basis of a first image for defect detection which is obtained through image capture by the image pickup element and which has not been subjected to defective pixel correction, detects point defects of the image pickup element in accordance with point defect detecting conditions for detecting point defects which are formed by a single or a small number of defective pixels being distributed in dot form; a line defect detector that, on the basis of a second image for defect detection which is obtained through image capture by the image pickup element and which has not been subjected to defective pixel correction, detects line defects of the image pickup element in accordance with line defect detecting conditions for detecting line defects which are formed by a plurality of defective pixels being distributed rectilinearly; and a defective pixel information register that stores results of detection of the point defects and results of detection of the line defects in the storage section as the defective pixel information.

A second aspect of the present invention is an image processing method including: detecting point defects of an image pickup element on the basis of a first image for defect detection, which is obtained through image capture by the image pickup element and which has not been subjected to defective pixel correction, and in accordance with point defect detecting conditions for detecting point defects which are formed by a single or a small number of defective pixels being distributed in dot form; detecting line defects of the image pickup element on the basis of a second image for defect detection, which is obtained through image capture by the image pickup element and which has not been subjected to defective pixel correction, and in accordance with line defect detecting conditions for detecting line defects which are formed by a plurality of defective pixels being distributed rectilinearly; storing results of detection of the point defects and results of detection of the line defects in a storage section as defective pixel information; and performing correction of defective pixels on an image captured by the image pickup element, on the basis of the defective pixel information stored in the storage section.

Accordingly, point defects and line defects of the image pickup element can be detected and corrected accurately and in a short period of time.

A third aspect of the present invention is a computer readable storage medium storing a program causing a computer including a storage section for storing defective pixel information expressing defective pixels of an image pickup element, to execute an image processing, the image processing including: detecting point defects of the image pickup element on the basis of a first image for defect detection, which is obtained through image capture by the image pickup element and which has not been subjected to defective pixel correction, and in accordance with point defect detecting conditions for detecting point defects which are formed by a single or a small number of defective pixels being distributed in dot form; detecting line defects of the image pickup element on the basis of a second image for defect detection, which is obtained through image capture by the image pickup element and which has not been subjected to defective pixel correction, and in accordance with line defect detecting conditions for detecting line defects which are formed by a plurality of defective pixels being distributed rectilinearly; storing results of detection of the point defects and results of detection of the line defects in the storage section as the defective pixel information; and performing correction of defective pixels on an image picked up by the image pickup element, on the basis of the defective pixel information stored in the storage section.

This aspect is a program storage medium for causing a computer, which has the storage section, to function as the above-described correction section, point defect detector, line defect detector, and defective pixel information register. Therefore, due to the computer executing the above-described image processing program, the computer functions as the image processing device of the first aspect. Accordingly, point defects and line defects of the image pickup element can be detected and corrected accurately and in a short period of time.

BRIEF DESCRIPTION OF THE DRAWINGS

Exemplary embodiments of the present invention will be described in detail based on the following figures, wherein:

FIG. 6 is a schematic drawing showing yet another embodiment of pixel defect detection processing.

DETAILED DESCRIPTION OF THE INVENTION

Figure 1:
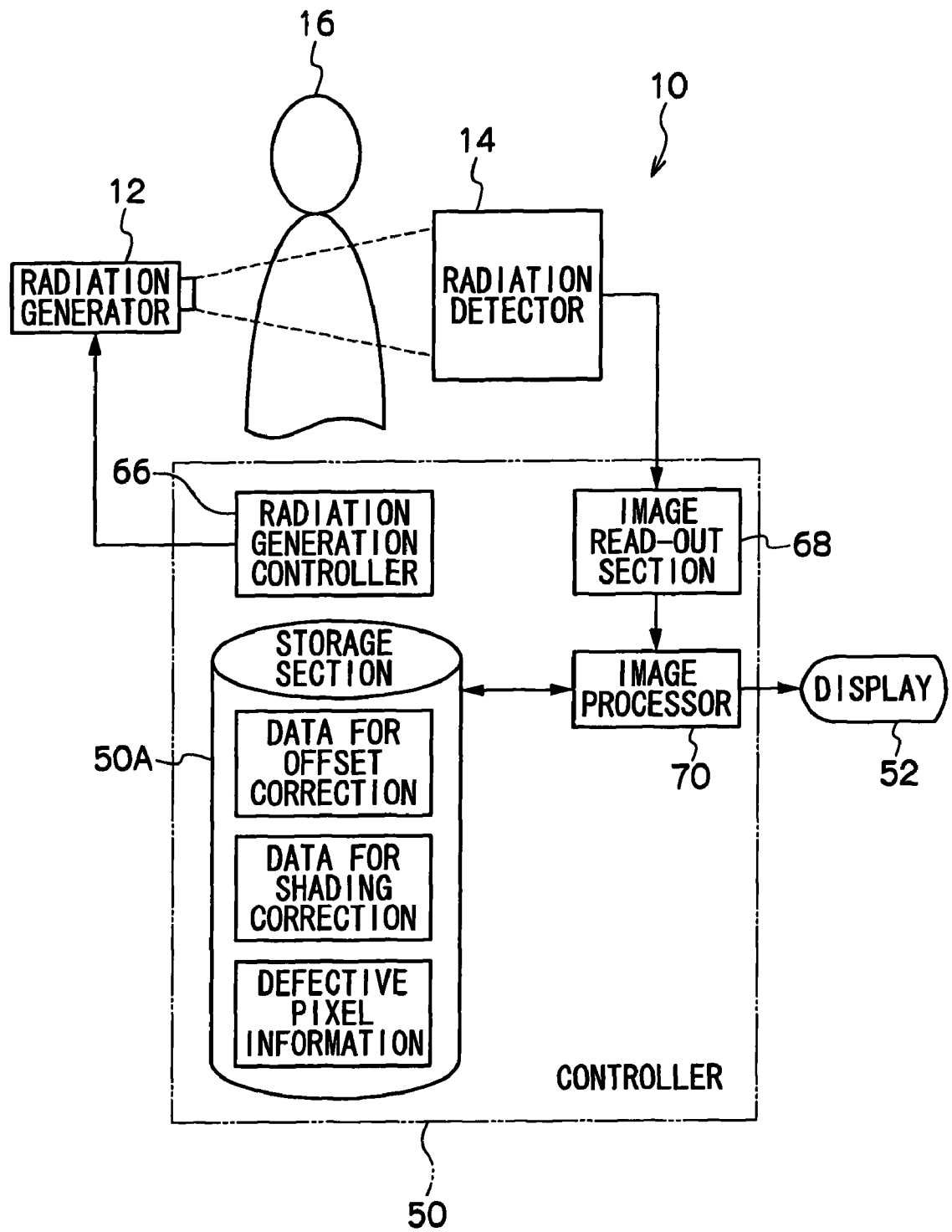
FIG. 1 is a block diagram showing the schematic structure of a radiographic image photographing device relating to the exemplary embodiments.

The image processing device of an exemplary embodiment of the present invention may include a storage section for storing defective pixel information expressing defective pixels of an image pickup element. On the basis of the defective pixel information stored in the storage section, a correction section carries out correction of defective pixels on an image captured by the image pickup element. Note that the defective pixel information can be structured to include position information which expresses the positions of the defective pixels of the image pickup element. This position information may be information respectively indicating the positions of the individual defective pixels of the image pickup element. Or, the position information may be include information which respectively indicates the position, shape and size (range of distribution) in units of the pixel defects which are detected by the line defect detector and the point defect detector which will be described hereinafter (i.e., defects which are formed from one or plural defective pixels). A correction method in which, for example, on the basis of the defective pixel information, the value (e.g., the luminance value or the density value or the like) of a defective pixel on the image which is captured by the image pickup element is determined by interpolation or the like from the values of the non-defective pixels which exist at the periphery of the defective pixel on the image, and the value of the defective pixel is replaced by a value which is determined by interpolation or the like, may be employed for the correction of the defective pixels by the correction section. However, another correction method may be employed.

The device may include a point defect detector and a line defect detector. On the basis of a first image for defect detection which is obtained through image capture by the image pickup element and has not been subjected to defective pixel correction, the point defect detector detects point defects of the image pickup element in accordance with point defect detecting conditions for detecting point defects which are formed by a single or a small number of defective pixels being distributed in the form of dots. On the basis of a second image for defect detection which is obtained through image capture by the image pickup element and has not been subjected to defective pixel correction, the line defect detector detects line defects of the image pickup element in accordance with line defect detecting conditions for detecting line defects which are formed by a plurality of defective pixels being distributed rectilinearly. Note that, as the above-described images for defect detection, there can be used an image which is obtained by image capture by the image pickup element in a state in which electromagnetic waves (e.g., radiation or light or the like) which the image pickup element is sensitive to are made incident uniformly onto the entire surface of the detecting surface of the image pickup element, or an image which is obtained by subjecting this image to predetermined image processing (e.g., at least one of shading correction, offset correction, and median subtraction which will be described later).

By detecting point defects in accordance with the point defect detecting conditions and detecting line defects in accordance with the line defect detecting conditions in this way, the detecting conditions can be optimized for each type of defect (point defect/line defect) which is the object of detection. Accordingly, noise which is superimposed on the image for defect detection is not mistakenly detected as a pixel defect, and point defects and line defects of the image pickup element can be detected accurately. Further, the point defect detector and line defect detector perform detection of point defects and line defects, respectively, on the basis of the image for defect detection which has not been subjected to defective pixel correction. Therefore, there is no need to perform detection of point defects after the detection and correction of line defects have been carried out, as is the case with the technique disclosed in JP-A No. 2005-167773. Further, by performing the detection of point defects and the detection of line defects in parallel, detecting of the point defects and the line defects of the image pickup element can be completed in a short time period. Moreover, in the device of the exemplary embodiment, the results of detection of point defects by the point defect detector and the results of detection of the line defects by the line defect detector are stored in the storing section as defective pixel information by the defective pixel information register, and the above-described corrections are carried out by the correction section on the basis of this defective pixel information. Accordingly, the point defects and the line defects of the image pickup element can be detected and corrected accurately and in a short period of time.

Note that, the image pickup element may include a radiographic image detector including a photoelectric converting layer which is sensitive to radiation, and an image that is captured by the radiographic image detector may include an image expressing a spatial distribution of radiation incident on the radiographic image detector. In this case, the image, which is captured by the radiographic image detector which serves as the image pickup element, is an image that expresses the spatial distribution of the radiation that is incident on the radiographic image detector. However, the image pickup element relating to the embodiment is not limited to the aforementioned radiographic image detector, and may be another image pickup element such as, for example, a CCD sensor.

Further, the point defect detector may extract, from the first image for defect detection and as point defect candidate pixels, pixels having a value greater than or equal to a first threshold value, or pixels having a value that differs from a value of another pixel by an amount greater than or equal to the first threshold value, and thereafter, may detect, as line defects, lines at which a proportion of the extracted point defect candidate pixels among all pixels of the line is greater than or equal to a predetermined value, and detects, as point defects, pixels that do not correspond to the line defects among the extracted point defect candidate pixels. The line defect detector may extract, from the second image for defect detection and as line defect candidate pixels, pixels having a value greater than or equal to a second threshold value, or pixels having a value that differs from a value of a another pixel by an amount greater than or equal to the second threshold value, the second threshold value being smaller than the first threshold value, and thereafter, may detect, as line defects, lines at which a proportion of the extracted line defect candidate pixels among all pixels of the line is greater than or equal to a predetermined value, and excludes, from defective pixels, pixels which do not correspond to line defects among the extracted line defect candidate pixels.

In this structure, the point defect detector extracts, from the first image for defect detection and as point defect candidate pixels, pixels at which the a value (luminance value or density value) on the first image, or a difference between the value on the first image and a value of another pixel (the value of the other pixel may be the average value of all of the pixels in the first image for defect detection, or the like) is greater than or equal to a first threshold value. Thereafter, the point defect detector detects, as line defects, lines at which a proportion of the extracted point defect candidate pixels among all pixels of the line is greater than or equal to a predetermined value, and detects, as point defects, pixels that do not correspond to the line defects among the extracted point defect candidate pixels. In this way, the point defects of the image pickup element are detected, and, if there are line defects which correspond to the aforementioned conditions, they are also detected. However, as compared with point defects, line defects are easy to recognize visually even if the difference in luminance or the like between them and the surrounding pixels is small. Therefore, there is also the possibility that line defects, which do not correspond to the aforementioned conditions but can be visually recognized, will remain.

Therefore, in the above-described structure, the line defect detector extracts, from the second image for defect detection and as line defect candidate pixels, pixels at which a value on the second image or a difference between the value on the second image and a value of another pixel is greater than or equal to a second threshold value which is smaller than the first threshold value. Thereafter, the line defect detector detects, as line defects, lines at which a proportion of the extracted line defect candidate pixels among all pixels of the line is greater than or equal to a predetermined value. In this way, by extracting pixels as line defect candidate pixels by using the second threshold value which is smaller than the first threshold value, a larger number of pixels (pixels at which the difference in the luminance or the like and those of the surrounding pixels is smaller) are extracted as line defect candidate pixels than point defect candidate pixels extracted by the point defect detector. Lines, at which the proportion of the extracted line defect candidate pixels among all of the pixels is greater than or equal to a predetermined value, are detected as line defects. Accordingly, line defects, which were not detected by the point defect detector, also can reliably be detected.

On the other hand, by extracting pixels as line defect candidate pixels by using the second threshold value which is smaller than the first threshold value, there is a high possibility that pixels, at which merely noise is superimposed, will be included in among the extracted line defect candidate pixels. However, the line defect detector of the above-described structure excludes, from the defective pixels, pixels which do not correspond to line defects among the extracted line defect candidate pixels. Therefore, pixels at which merely noise is superimposed can be prevented from being mistakenly detected as defective pixels. Accordingly, the accuracy of detecting point defects and line defects of the image pickup element can be further improved.

In the above-described structure, the first image for defect detection, which the point defect detector uses in detecting point defects, and the second image for defect detection, which the line defect detector uses in detecting line defects, may be the same image.

Or, the second image may include an image obtained by performing at least shading correction, which corrects dispersion in respective sensitivities of individual pixels of the image pickup element, on a read-out image that is read out from the image pickup element, and the first image may include an image obtained by not performing the shading correction on the read-out image.

As described above, the second threshold value, which is used in extracting the line defect candidate pixels, is smaller than the first threshold value which is used in extracting the point defect candidate pixels. Therefore, there is a high possibility that pixels, at which merely noise is superimposed, will be included in among the extracted line defect candidate pixels. However, in the above-described structure, an image, which is obtained by performing at least shading correction on the read-out image, is used as the second image which is used in detecting line defects. Therefore, the noise included in the second image is reduced by the shading correction, and the proportion of pixels, at which noise is superimposed, included among the extracted line defect candidate pixels is reduced. The accuracy of detecting line defects can thereby be improved.

On the other hand, because the first threshold value, which is used in extracting the point defect candidate pixels, is larger than the second threshold value, it is more difficult to be affected by noise. However, in a case in which shading correction is carried out on an image in which a change has arisen in the luminance or the like which corresponds to a point defect, there is a high possibility that the range of the point defect (the range in which the change in the luminance or the like corresponding to a point defect has arisen) will be mistakenly detected due to the variation in the shape of the pattern of the luminance change or the like corresponding to the point defect. However, in the above-described structure, an image, which is obtained by not performing at least the shading correction on the read-out image, is used as the first image which is used in detecting point defects. Therefore, it is possible to prevent the range of the point defect from being mistakenly detected. Accordingly, the accuracy of detecting point defects and line defects of the image pickup element can be further improved.

In the above-described structure, the second image may include an image obtained by performing at least shading correction, which corrects dispersion in respective sensitivities of individual pixels of the image pickup element, on a read-out image that is read out from the image pickup element, and the first image may include an image obtained by not performing the shading correction on the read-out image. In this way, pixels, at which dispersion in the dark outputs of the individual pixels which are the objects of correction by the offset correction is superimposed as noise, can be prevented from being extracted as line defect candidate pixels at the time of extracting the line defect candidate pixels, and the accuracy of detecting line defects can be improved.

If there exists a pixel whose dark output differs greatly from those of other pixels, the difference in dark output between that pixel and other pixels can be corrected if offset correction is applied. However, there is a high possibility that this pixel may, depending on the conditions at the time of image capture or the like, be a pixel at which there has arisen an abnormality in the output value (the luminance or the like) which cannot be completely corrected even by the shading correction, i.e., a defective pixel. To address this, in the present structure, an image which is obtained by offset correction as well not being carried out on the read-out image is used as the first image. Thus, pixels, whose dark outputs differ greatly from those of other pixels and which have a high possibility of being defective pixels, also can be detected as point defects, and the accuracy of detecting point defects also can be improved.

Further, the image pickup element may include a radiographic image detector which includes a photoelectric converting layer sensitive to radiation, and from which an image is read out via a plurality of electrodes for read-out which respectively extend along a read-out direction of an image and are arrayed along a direction intersecting the read-out direction, the second image may include an image obtained by performing, on the read-out image and with respect to both the read-out direction and a direction intersecting the read-out direction, median subtraction which subtracts an image for correction obtained by applying a median filter of a predetermined direction to the read-out image, and the first image may include an image obtained by performing the median subtraction on the read-out image only with respect to the read-out direction.

As described above, in a case in which the image pickup element is a radiographic image detector which has a photoelectric converting layer sensitive to radiation, and from which an image is read-out via a plurality of electrodes for read-out which respectively extend along a read-out direction of an image and are arrayed along a direction intersecting the read-out direction, it is often the case that a noise component (a stripe-like luminance pattern), at which the luminance or the like fluctuates periodically along a direction intersecting the read-out direction, is superimposed on the image which is read-out from the radiographic image detector via the electrodes, over the entire surface of the image. However, in the above-described structure, an image which is obtained by performing median subtraction on the read-out image only with respect to the read-out direction is used as the first image which is used in detecting point defects. Accordingly, spike-like changes in the luminance or the like along the read-out direction are removed from the image for correction which is obtained by applying a median filter of the read-out direction to the read-out image, but on the other hand, the aforementioned noise component which fluctuates periodically (the stripe-like luminance pattern) is not removed. Therefore, by performing median subtraction which subtracts this image for correction from the read-out image, in the first image, spike-like changes in the luminance or the like along the read-out direction which should be extracted as point defects are preserved, and on the other hand, the aforementioned noise component which fluctuates periodically is removed. Accordingly, the aforementioned noise component which fluctuates periodically (the stripe-like luminance pattern) is not mistakenly detected as a line defect, and point defects can be detected accurately.

Further, in the above-described structure, an image obtained by performing median subtraction with respect to both the read-out direction and the direction intersecting the read-out direction is used as the second image which is used in detecting line defects. A noise component, in which the luminance or the like fluctuates periodically along a direction intersecting the read-out direction (a stripe-like luminance pattern) is removed from the second image by the median subtraction in the read-out direction. Other noise components (e.g., the dispersion in the luminance or the like which could not be completely corrected even by the shading correction (also called in-plane locality)) are removed from the second image by the median subtraction in the direction intersecting the read-out direction. Therefore, line defects can be detected accurately. Accordingly, the accuracy of detecting point defects and line defects can be improved even more.

Exemplary embodiments of the present invention will be described in detail hereinafter with reference to the drawings. A radiographic image photographing device 10 relating to the exemplary embodiments is shown in FIG. 1. The radiographic image photographing device 10 has a radiation generator 12 which generates radiation such as X-rays, and a radiation detector 14 which is provided so as to be spaced apart from the radiation generator 12. The region between the radiation generator 12 and the radiation detector 14 is a photographing position at which a subject 16 is positioned at the time of photographing. The radiation, which exits from the radiation generator 12 and carries image information by passing through the subject 16 positioned at the photographing position, is irradiated onto the radiation detector 14.

The radiation detector 14 is structured to include a radiographic image detector 20. The radiographic image detector has an electrostatic recording portion which includes a photoconductive layer which exhibits electrical conductivity by receiving the irradiation of the radiation. The radiographic image detector receives the irradiation of radiation carrying image information, and records the image information in the electrostatic recording portion, and outputs image signals expressing the recorded image information. Examples of the radiographic image detector are an optical-reading-type radiographic image detector which reads the image information recorded in the electrostatic recording portion by using a semiconductive material which generates charges due to the irradiation of light, and a TFT-type radiographic image detector which accumulates charges generated due to the irradiation of radiation and reads the accumulated charges by turning switching elements, such as thin film transistors (TFTs), on/off per pixel, and the like. Hereinafter, the structure of an optical-reading-type radiographic image detector will be described as an example.

Figure 2:
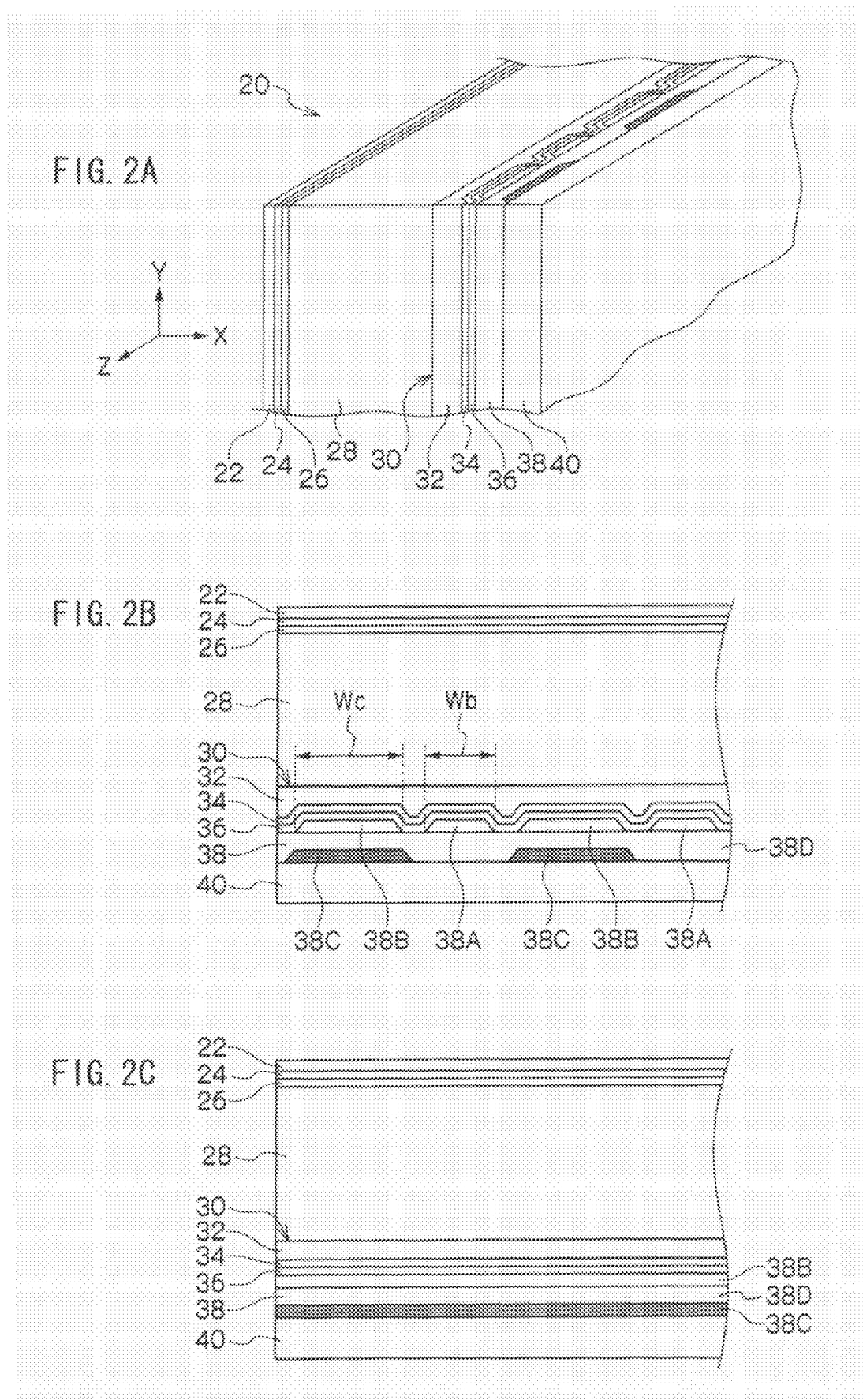
FIG. 2A is a perspective view of a radiographic image detector.
FIG. 2B is a cross-sectional view along line X-Z of FIG. 2A.
FIG. 2C is a cross-sectional view along line X-Y of FIG. 2A.
Figure 3:
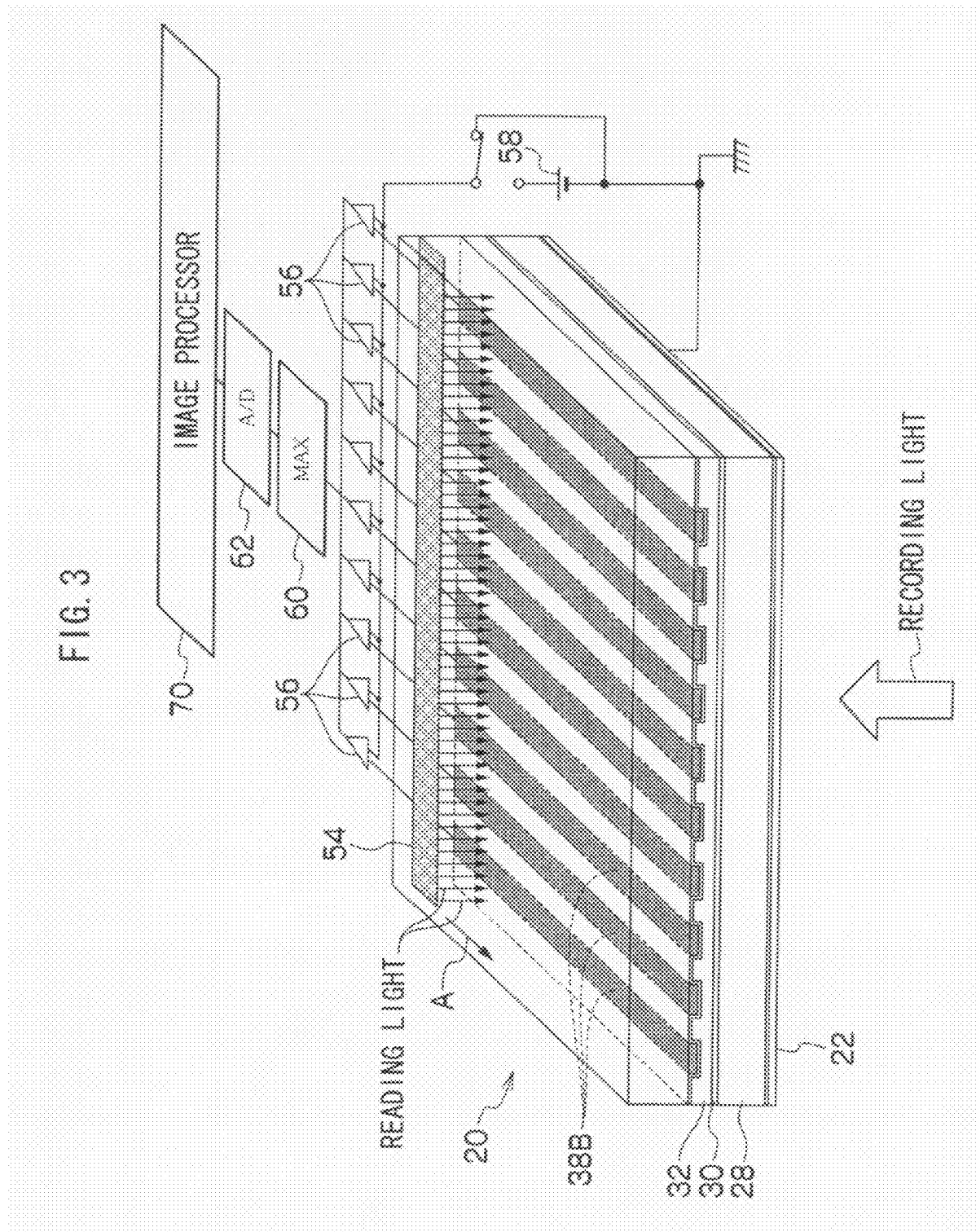
FIG. 3 is a schematic drawing of the radiographic image detector, which includes electrodes, and an image read-out section.

As shown in FIG. 2A through FIG. 2C, the optical-reading-type radiographic image detector 20 is structured by a first electrode layer 22, a photoconductive layer for recording 28, a photoconductive layer for reading 32, a second electrode layer 38, and a substrate 40 being provided in that order. The first electrode layer 22 is transmissive with respect to the radiation from the radiation generator 12 (which is called "recording light" in order to distinguish it from "reading light" which will be described later). The photoconductive layer for recording 28 generates charge pairs and exhibits electrical conductivity when the recording light, which is transmitted through the first electrode layer 22, is irradiated thereon. The photoconductive layer for reading 32 generates charge pairs and exhibits electrical conductivity when reading light is irradiated thereon. The second electrode layer 38 is formed from first transparent linear electrodes 38A, second transparent linear electrodes 38B, light blocking films 38C and an insulating layer 38D. Further, as shown in FIG. 3, a linear light source 54, which is for irradiating reading light onto the radiographic image detector 20, is provided at the substrate 40 side of the radiographic image detector 20.

An electron injection impeding layer 24, which suppresses electron injection from the first electrode layer 22, and a crystallization preventing layer 26, which suppresses crystallization of the photoconductive layer for recording, are provided in that order between the first electrode layer 22 and the recording photoconductive layer 28. A crystallization preventing layer 34, which suppresses crystallization of the reading photoconductive layer 32, and a hole injection impeding layer 36, which suppresses hole injection from the transparent linear electrodes 38A, 38B when high voltage is applied, are provided in that order between the reading photoconductive layer 32 and the second electrode layer 38. Further, a charge accumulating section 30, which accumulates latent image polarity charges (i.e., charges forming a latent image), and which carry the radiographic image generated within the photoconductive layer for recording 28, is formed two-dimensionally at the interface between the recording photoconductive layer 28 and the reading photoconductive layer 32.

Note that the size (surface area) of the radiographic image detector 20 can be made to be, for example, greater than or equal to 20 cm×20 cm, and in particular, about an effective size of 43 cm×43 cm in the case of photographing the chest. Further, the hole injection impeding layer 36 can be structured of $CeO_2$, $ZnS$, or the like which are exemplary materials. These may not only be a single layer, and may be laminated in many layers in order to strengthen the positive hole impeding ability (and in order to reduce dark current). The thickness of the hole injection impeding layer 36 may be greater than or equal to 20 nm and less than or equal to 100 nm. Further, the electron injection impeding layer 24 can be structured of a material such as $Sb_2S_3$ or an organic compound. The electron injection impeding layer 24 also may be laminated in many layers and not just a single layer. Further, for the crystallization preventing layers 26, 34, binary systems such as Se—As, Se—Ge, Se—Sb compounds or the like or ternary systems such as Se—Ge—Sb, Se—Ge—As, Se—Sb—As or the like, which have a high crystallization temperature, may be used.

A photoconductive substance whose main component is a-Se (amorphous selenium) may be used for the recording photoconductive layer 28. The thickness of the recording photoconductive layer 28 may be greater than or equal to 50 μm and less than or equal to 1000 μm, in order to be able to sufficiently absorb the recording light. Moreover, photoconductive substances whose main component is Se, such as, for example, a-Se which is doped with 10 to 200 ppm of Cl which has a large difference between the mobility of negative charges charged at the first electrode layer 22 and the mobility of positive charges which are the opposite polarity thereof, or Se—Ge, Se—Sb, Se—As, and the like may be used for the reading photoconductive layer 32. The thickness of the reading photoconductive layer 32 may be less than or equal to ½ of the thickness of the recording photoconductive layer 28. Moreover, the thinner the reading photoconductive layer 32, the better the responsiveness at the time of reading. Therefore, the thickness of the photoconductive layer for reading 32 may be made to be, for example, less than or equal to ¹⁄₁₀ and further, less than or equal to ¹⁄₁₀₀, or the like of the thickness of the recording photoconductive layer 28.

The aforementioned materials of the respective layers are examples in cases in which negative charges are charged to the first electrode layer 22, positive charges are charged to the transparent linear electrodes 38A, 38B of the second electrode layer 38, negative charges serving as latent image polarity charges (i.e., charges forming a latent image) are accumulated in the charge accumulating section 30 formed at the interface of the recording photoconductive layer 28 and the reading photoconductive layer 32, and the photoconductive layer for reading 32 is made to function as a so-called positive hole transport layer in which the mobility of the positive charges, which serve as transport polarity charges (i.e., transporting charges) and are the opposite polarity, is greater than the mobility of the negative charges serving as the latent image polarity charges. However, these may respectively be charges of opposite polarities. When the polarities are reversed in this way, it suffices to perform minor changes such as changing the reading photoconductive layer which functions as a positive hole transport layer into a reading photoconductive layer which functions as an electron transport layer. Further, the reading photoconductive layer 32 may be made to be a layer whose main component is a-Se, and an $As_2Se_3$, GeSe, $GeSe_2$, or $Sb_2Se_3$ layer may be provided as the charge accumulating section 30.

It suffices for the first electrode layer 22 and the first transparent linear electrodes 38A to be transmissive with respect to recording light or reading light. For example, in a case in which the layer is made to be transmissive with respect to visible light, an oxide metal such as SnO2, ITO (Indium Tin Oxide) or IZO (Indium Zinc Oxide) which are known as light-transmissive metal thin films, or IDIXO (Indium X-metal Oxide manufactured by Idemitsu Kosan Co., Ltd.), which is an amorphous light-transmissive oxide metal which can be easily etched can be made to be a thickness of about 50 to 200 nm, and preferably greater than or equal to 100 nm, and used. Further, in a case in which X-rays are used as the recording light and the X-rays are irradiated from the first electrode layer 22 side so as to record a radiographic image, the first electrode layer 22 does not need to be transmissive with respect to visible light. Therefore, the first electrode layer 22 may be formed by using a pure metal of Al or Au or the like of a thickness of 100 nm, for example.

The first transparent linear electrodes 38A of the second electrode layer 38 are arrayed in the form of stripes at the pixel pitch. The pixel pitch can be made to be about 50 to 250 μm in order to realize a high S/N ratio while maintaining high sharpness in X-ray photography for medical care. Within this range of the pixel pitch, the width of the first transparent linear electrode 38A can be made to be about 10 to 200 μm. Further, the second transparent linear electrodes 38B of the second electrode layer 38 are provided as electrically conductive members for outputting electrical signals of levels corresponding to the amounts of the latent image polarity charges accumulated in the charge accumulating section 30. Similarly to the first transparent linear electrodes 38A, the second transparent linear electrodes 38B are arrayed in the form of stripes. By setting the electrodes of the second linear electrode layer 38 in the form of stripes, correction of structure noise can be made to be simple, the S/N ratio of the image can be improved by lowering the capacitance, and parallel reading (mainly the main scanning direction) can be carried out such that the reading time can be shortened.

At the second electrode layer 38, the second transparent linear electrodes 38B and the first transparent linear electrodes 38A are arrayed so as to be disposed parallel to one another. The aforementioned light-transmissive metal thin films may be used as the second transparent linear electrodes 38B. In this case, patterns of the first transparent linear electrodes 38A and the second transparent linear electrodes 38B can be formed simultaneously in a single lithography process. In this case, the light blocking films 38C, which are formed from members having poor light transmissivity, are provided at the portions on the substrate 40 which correspond to the respective second transparent linear electrodes 38B, such that the irradiation intensity of the reading light onto the second transparent linear electrodes 38B is smaller than the irradiation intensity of the reading light onto the first transparent linear electrodes 38A. In this way, a transmissivity Pc with respect to the reading light can be made to be less than or equal to 10%, or in other words, a light blocking ability can be provided. Thereby, it is possible for charge pairs for signal take-out to not be generated within the portions of the photoconductive layer for reading 32 which correspond to the second transparent linear electrodes 38B. Further, the hole injection impeding layer 36, which is a thin film of less than or equal to 100 nm, is formed on the first transparent linear electrodes 38A and the second transparent linear electrodes 38B. Moreover, predetermined distances are provided between the respective first transparent linear electrodes 38A and the respective second transparent linear electrodes 38B so that they are electrically insulated.

At the radiographic image detector 20, a width Wc of the second transparent linear electrodes 38B may be made wider than a width Wb of the first transparent linear electrodes 38A, and a transmissivity Prb of the first transparent linear electrodes 38A with respect to the reading light and a transmissivity Prc of the second transparent linear electrodes 38B with respect to the reading light may be set to satisfy the conditional formula:

$$(Wb \times Prb)/(Wc \times Prc) \geqq 5$$

In this case, together with making the width Wc of the second transparent linear electrodes 38B wider than the width Wb of the first transparent linear electrodes 38A, at the time of recording an electrostatic latent image, the first transparent linear electrodes 38A and the second transparent linear electrodes 38B are connected, and the second transparent linear electrodes 38B are actively utilized in the formation of the electric field distribution. When the first transparent linear electrodes 38A and the second transparent linear electrodes 38B are connected in this way and recording is carried out, the latent image polarity charges are accumulated not only at the positions corresponding to the first transparent linear electrodes 38A, but also at the positions corresponding to the second transparent linear electrodes 38B. When the reading light is irradiated through the first transparent linear electrode 38A to the reading photoconductive layer 32 at the time of reading, the latent image polarity charges of the regions above the two second transparent linear electrodes 38B which sandwich the first transparent linear electrode 38A are successively read-out via the two second transparent linear electrodes 38B. Accordingly, in this case, the position corresponding to the first transparent linear electrode 38A becomes the pixel center, and respective halves of the second transparent linear electrodes 38B, which are sandwiching this first transparent linear electrode 38A at the both sides thereof, become one pixel in the direction in which the first transparent linear electrodes 38A and the second transparent linear electrodes 38B are lined-up. Further, electrically conductive members having better electrical conductivity than the first transparent linear electrodes 38A and the second transparent linear electrodes 38B may be used as bus lines, and may be provided for each of the respective first transparent linear electrodes 38A and each of the respective second transparent linear electrodes 38B so as to extend in the lengthwise directions thereof.

The light blocking films 38C do not necessarily have to be a material which is insulating, and materials which are such that the specific resistance of the light blocking films 38C becomes greater than or equal to $2 \times 10^{-6}$ Ω·cm (and more preferably, less than or equal to $1 \times 10^{15}$ Ω·cm) can be used. For example, if the material which is used is a metal material, Al, Mo, Cr or the like can be used. If the material which is used is an inorganic material, MoS2, WSi2, TiN, or the like can be used. Note that it is more preferable to use a material such that the specific resistance of the light blocking films 38C becomes greater than or equal to 1 Ω·cm. Further, when an electrically conductive material such as a metal material is used as the light blocking films 38C, in order to avoid direct contact between the light blocking films 38C and the second transparent linear electrodes 38B, an insulator is disposed between the both. At the radiographic image detector 20 of the exemplary embodiments, the insulating layer 38D which is formed from SiO2 or the like is provided, as this insulator, between the reading photoconductive layer 32 and the substrate 40. A thickness of the insulating layer 38D may be about 0.01 to 10 μm. When forming the light blocking films 38C, given that the irradiation intensity of the reading light onto the first transparent linear electrodes 38A is Ub and the irradiation intensity onto the second transparent linear electrodes 38B is Uc, the light blocking films 38C may be made to be a thickness such that Ub/Uc≧5 is satisfied. The constant in the right side of the above formula is preferably made to be 8, and even more preferably made to be 12.

Further, given that the interval between the first transparent linear electrode 38A and the second transparent linear electrode 38B is Wbc, a width Wd of the light blocking film 38C may be made so as to satisfy:

$$Wc \leq Wd \leq (Wc+2 \times Wbc)$$

This conditional formula indicates that the light blocking films 38C completely cover at least the second transparent linear electrodes 38B, and the light blocking films 38C do not span to the portions corresponding to the first transparent linear electrodes 38A so that at least portions corresponding to the widths Wb of the first transparent linear electrodes 38A are ensured as transmitting portions of the reading light. However, if the light blocking films 38C are provided only at portions corresponding to the widths Wc of the second transparent linear electrodes 38B, the light blocking may be insufficient, and if the transmitting portions of the reading light are only portions corresponding to the widths Wb of the first transparent linear electrodes 38A, there is the concern that the reading light which reaches the first transparent linear electrodes 38A may be insufficient. Therefore, it is more preferable to satisfy:

$$(Wc+Wbc/2) \leq Wd \leq (Wc+Wbc)$$

Further, as shown in FIG. 1, the radiation generator 12 and the radiation detector 14 are respectively connected to a controller 50. The controller 50 is structured to include a computer having a CPU, a memory formed from a RAM or the like, and a nonvolatile storage section 50A formed from an HDD (Hard Disk Drive) or the like (portions other than the storage section 50A are omitted from the drawing), and peripheral circuits which are connected to the computer. Due to predetermined programs which are stored in the nonvolatile storage section 50A being executed by the CPU of the computer and the computer and the peripheral circuits working in cooperation, the controller 50 functions as a radiation generation controller 66 which controls the generation of radiation at the radiation generator 12, and functions as an image read-out section 68 which carries out reading-out of image information from the radiographic image detector 20. A display 52 for displaying radiographic images is also connected to the controller 50.

As shown in FIG. 3, the image read-out section 68 is structured to include the aforementioned linear light source 54. The linear light source 54 is structured such that a large number of LEDs (e.g., LEDs which emit B light), are arrayed along the direction (the main scanning direction) in which the second transparent linear electrodes 38B (and the first transparent linear electrodes 38A) are arrayed at the radiographic image detector 20. At the time of reading-out image information from the radiographic image detector 20, the large number of LEDs are respectively lit by a driving circuit (not shown) which is a part of the image read-out section 68, and irradiate reading light which is linear onto the substrate 40 side surface of the radiographic image detector 20. Further, the linear light source 54 is supported so as to be movable above the substrate 40 side surface of the radiographic image detector 20 along the direction in which the second transparent linear electrodes 38B extend (the subscanning direction (read-out direction): the direction of arrow A in FIG. 3), by an unillustrated moving mechanism which is a part of the image read-out section 68. At the time of reading-out image information from the radiographic image detector 20, the linear light source 54 is moved (subscanned) in the subscanning direction at a uniform moving speed by the aforementioned moving mechanism. In this way, the linear reading light is irradiated in order onto the entire substrate 40 side surface of the radiographic image detector 20.

The image read-out section 68 includes plural charge amplifiers 56, a high-voltage power source 58, a multiplexer (MPX) 60, and an A/D converter 62. The respective charge amplifiers 56 are connected to respectively different second transparent linear electrodes 38B of the radiographic image detector 20. The high-voltage power source 58 applies high voltage between the substrate 40 and the individual second transparent linear electrodes 38B via the charge amplifiers 56, at the time when radiation is irradiated onto the radiographic image detector 20. The multiplexer 60 is connected to the respective output ends of the plural charge amplifiers 56, and selectively outputs an electrical signal which is inputted from any of the charge amplifiers 56. The A/D converter 62 is connected to the output end of the multiplexer 60, and converts the electrical signal inputted via the multiplexer 60 into digital data, and outputs the digital data.

At the radiographic image detector 20, when the linear reading light emitted from the linear light source 54 is irradiated, among the image information recorded in the radiographic image detector 20, which is formed by latent image polarity charges accumulated in the charge accumulating section 30, the image information of one line which is recorded at the portion where the reading light is irradiated is, via the individual second transparent linear electrodes 38B, outputted as electrical signals of levels corresponding to the amounts of the latent image polarity charges for the respective pixels. The multiplexer 60 switches, in order, the electrical signals outputted to the A/D converter 62 so that the electrical signals, which are outputted via the individual second transparent linear electrodes 38B and are amplified by the charge amplifiers 56, are outputted in order (sequentially) to the A/D converter 62. In this way, image data of one line is outputted in order from the A/D converter 62. By repeating the above-described processings during the time until the linear reading light emitted from the linear light source 54 is irradiated onto the entire substrate 40 side surface of the radiographic image detector 20, all of the image information of the surface of the image recorded in the radiographic image detector 20 is read-out as image data.

Further, an image processing program also is stored in the nonvolatile storage section of the controller 50. Due to this image processing program being executed by the CPU, the controller 50 functions also as an image processor 70 shown in FIG. 3.

Next, processing which is realized by the image processor 70 will be described as the operation of the exemplary embodiment. When image data, which is read-out from the radiographic image detector 20 by the image read-out section 68, is inputted, the image processor 70 carries out offset correction, shading correction, and defective pixel correction, in that order, on the inputted image data. Then, due to the image processor 70 outputting the image data, which has undergone the respective corrections, to the display 52, a radiographic image expressed by the image data is displayed on the display 52. The respective corrections that the image processor 70 carries out will be described in order hereinafter.

Even in a state in which radiation is not irradiated onto the radiographic image detector 20 (i.e., even in a state in which latent image polarity charges are not accumulated in the charge accumulating section 30 and image information is not recorded), dispersion is brought about in the values of the respective pixels (i.e., there is dispersion in the offsets which are added to the values of the respective pixels) in the image data which is read-out from the radiographic image detector 20. Offset correction corrects this dispersion. In the offset correction, image data is read-out by the image read-out section 68 from the radiographic image detector 20 to which radiation is not irradiated, and the read-out image data is stored in advance in the storage section 50A as data for offset correction which expresses the magnitude of the offset (the dark output) of each pixel. Then, when image data which includes image information is read-out from the radiographic image detector 20 by the image read-out section 68 and inputted to the image processor 70, offset correction is carried out by subtracting the offset amounts of the respective pixels which are expressed by the data for offset correction, from the values of the respective pixels of this image data, respectively. In this way, deterioration in the quality of the radiographic image, which is caused by dispersion in the offsets (dark outputs) of the respective pixels of the radiographic image detector 20, can be corrected.

Further, there are cases in which, among the respective pixels of the radiographic image detector 20, there arise pixels at which the slope of the relationship between the irradiated radiation dose and the amount of latent image polarity charge accumulated in the charge accumulating section 30 (i.e., the photoelectric converting characteristic) is different than that of other pixels due to, for example, deterioration which accompanies radiation being irradiated repeatedly or the like. Shading correction corrects the dispersion in the photoelectric converting characteristics. In shading correction, in a state in which the subject 16 does not exist at the photographing position, radiation of a fixed level is generated by the radiation generator 12, and the radiation of the fixed level is irradiated onto the entire surface of the radiographic image detector 20. Thereafter, image data is read-out from the radiographic image detector 20 by the image read-out section 68, and the above-described offset correction is carried out on the read-out image data. On the basis of the dispersion in the values of the respective pixels of the image data which has undergone the offset correction (the dispersion in the values at this time is due to the dispersion in the photoelectric converting characteristics of the respective pixels), the gain of each pixel is determined and is stored in the storage section 50A as data for shading correction. After the above-described offset correction is carried out on the image data which includes the image information and is read-out from the radiographic image detector 20 by the image read-out section 68, shading correction is carried out by multiplying the gains of the respective pixels, which are expressed by the data for shading correction, by the values of the respective pixels of the image data which has undergone the offset correction, respectively. In this way, deterioration in the quality of the radiographic image, which is caused by the dispersion in the photoelectric converting characteristics of the respective pixels of the radiographic image detector 20, can be corrected.

Further, there are cases in which, among the respective pixels of the radiographic image detector 20, pixels at which an electrical signal corresponding to the amount of the latent image polarity charge accumulated in the charge accumulating section 30 is not outputted, i.e., defective pixels, arise due to, for example, deterioration which accompanies radiation being irradiated repeatedly, or poor contact of the electrical circuits which extend from the second transparent linear electrodes 38B via the charge amplifiers 56 to the multiplexer 60, or the like. Defective pixel correction corrects the outputs (values) of the defective pixels on the image data. In the exemplary embodiment, defective pixels which are included in the respective pixels of the radiographic image detector 20 are detected by defective pixel detection processing which will be described later, and defective pixel information expressing the positions of the individual defective pixels which are detected are stored in the storage section 50A. In the defective pixel correction, after the above-described offset correction and shading correction are carried out in order on the image data which includes the image information and is read-out from the radiographic image detector 20 by the image read-out section 68, the values of the individual defective pixels, which are recognized on the basis of the defective pixel information among the respective pixels of the image data which has undergone the offset correction and shading correction, are respectively determined by interpolation from the values of the plural non-defective pixels existing at the periphery of the corresponding defective pixel, and the values of the individual defective pixels are replaced by the values determined by interpolation. In this way, deterioration in the quality of the radiographic image caused by defective pixels of the radiographic image detector 20 can be corrected. As described above, the image data read-out from the radiographic image detector 20 by the image read-out section 68 is subjected to offset correction, shading correction, and defective pixel correction in that order, and thereafter, the processed image data is outputted to the display 52. Thereby, a high-quality radiographic image, in which deterioration in image quality due to dispersion in the offsets (dark outputs) of the respective pixels of the radiographic image detector 20, dispersion in the photoelectric converting characteristics of the respective pixels, and the defective pixels is corrected, can be displayed on the display 52. Note that image data which have undergone, in addition to the above-described respective corrections, other processings as well such as median subtraction which will be described later or the like, may be outputted to and displayed on the display 52. Further, instead of displaying the image data on the display 52, the image data may be recorded on a flash memory or another information recording medium, or may be recorded as an image onto a sheet-like recording material by a recording device such as a printer.

Pixel defects at the radiographic image detector 20 can be broadly classified into pixel defects (point defects) which are formed by a single or a small number of defective pixels being distributed in the form of dots, and pixels defects (line defects) which are formed by plural defective pixels being distributed rectilinearly. Note that point defects arise mainly due to deterioration due to irradiation of radiation, whereas line defects arise mainly due to poor contact of electrical wires. Further, as compared with point defects, line defects are easy to recognize visually even if the difference in luminance or the like between them and the surrounding pixels is small. Therefore, at the time of detecting defective pixels, if the threshold value for detection is set such that line defects which are easily visually recognized can be reliably detected, at regions other than the defective pixels of the radiographic image detector 20, noise which is superimposed on the image data may be also detected as defective pixels. Therefore, the image processor 70 relating to the exemplary embodiment detects defective pixels (point defects and line defects) by performing the defective pixel detection processing shown in FIG. 4. Note that this defective pixel detection processing is carried out periodically, for example, at the time of the start of business each day (the same holds for the generation and storage of the above-described offset correction data and shading correction data).

Figure 4:
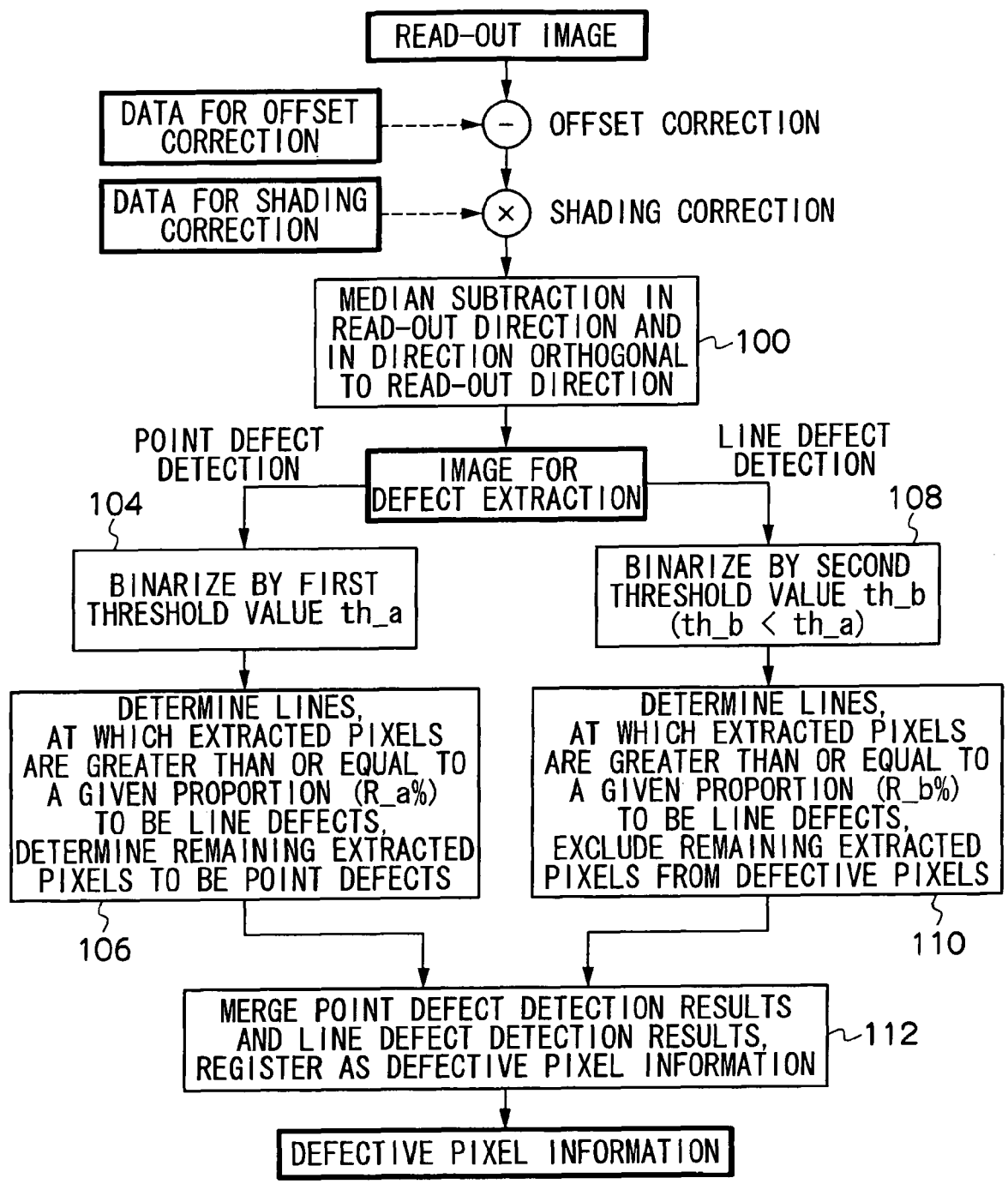
FIG. 4 is a schematic drawing showing an example of pixel defect detection processing.

In the defective pixel detection processing shown in FIG. 4, the image data read-out from the radiographic image detector 20 by the image read-out section 68 (called the "read-out image" in FIG. 4), is first subjected to offset correction on the basis of the offset correction data stored in the storage section 50A. Then, shading correction is carried out on the basis of the shading correction data stored in the storage section 50A. Note that, as the image data which is used in the defective pixel detection processing, there is used image data which is read-out by the image read-out section 68 from the radiographic image detector 20 after, when the subject 16 does not exist at the photographing position, radiation of a fixed level (radiation of a level lower than at the time of acquiring the data for shading correction, e.g., radiation of ½ of the radiation dose) is generated by the radiation generator 12 and the radiation of the fixed level is irradiated onto the entire surface of the radiographic image detector 20.

Next, the image data which has undergone the offset correction and shading correction is subjected to median subtraction with respect to both the direction of reading-out image data from the radiographic image detector 20 (the direction in which the second transparent linear electrodes 38B extend: the subscanning direction) and a direction (the main scanning direction) which is orthogonal to this read-out direction (see step 100 of FIG. 4). Median subtraction with respect to a predetermined direction is carried out by determining image data for correction by applying a median filter of the predetermined direction to the image data (i.e., performing, on all of the pixels of the image, one-dimensional median computation which makes the intermediate value at a row of pixels, in which the object pixel is the center and which includes several pixels before and after the object pixel along the predetermined direction, be the value of the object pixel), and, for each pixel, subtracting the image data for correction from the original image data. By performing this median subtraction with respect to each of the image data read-out direction and the direction orthogonal thereto, the relatively low-frequency noise component, which is superimposed on the image data and cannot be completely corrected in the shading correction, can be reduced while dulling of the edges of the image is suppressed. (However, spike-like changes in luminance which should be extracted as point defects are preserved.) Note that performing median subtraction in two directions which are orthogonal to one another can be realized also by subtracting image data for correction, which is obtained by performing two-dimensional median computation, from the original image data.

In the defective pixel detection processing shown in FIG. 4, the image data, which has undergone the above-described offset correction, shading correction and median subtraction in two directions, is used as an image for defect extraction, and detection processing of point defects and detection processing of line defects are carried out in parallel to one another by using the same image for defect extraction. Note that performing point defect detection processing and line defect detection processing in parallel can be realized by, for example, executing, in parallel and by the CPU of the controller 50, a thread or process which carries out point defect detection processing and a thread or process which carries out line defect detection processing. However, the exemplary embodiment is not limited to the same. For example, plural high speed computing devices such as DSPs (Digital Signal Processors) may be provided separately from the CPU, and the point defect detection processing and the line defect detection processing may be carried out in parallel at the individual computing devices. In this way, the point defect detection processing and the line defect detection processing, which will be described hereinafter, can respectively be completed in a short period of time.

In the point defect detection processing which uses the image for defect extraction, first, the values of the respective pixels of the image for defect extraction are respectively compared with a first threshold value th_a which is set for point defect detection, and the image for defect extraction is binarized on the basis of the results of comparison. The respective pixels of the image for defect extraction are thereby classified into point defect candidate pixels and pixels other than those (see step 104 in FIG. 4). Note that the first threshold value th_a is set to a value which is larger than a second threshold value th_b for line defect detection which will be described later. Therefore, it is possible to prevent pixels, at which merely noise is superimposed, from being classified as point defect candidate pixels.

Then, by referring to the results of binarization per line of the image for defect extraction, lines, at which the proportion of pixels which were classified as point defect candidate pixels by the binarization is greater than or equal to a given value (R_a %), are determined to be line defects. Storage, as defective pixels corresponding to a line defect, of all of the pixels of a line determined to be a line defect is carried out for all of the lines. The point defect candidate pixels remaining after this line defect determination (point defect candidate pixels which are positioned on a line which is not determined to be a line defect) are stored as defective pixels corresponding to point defects (see step 106 of FIG. 4).

On the other hand, in the line defect detection processing using the image for defect extraction, first, the values of the respective pixels of the image for defect extraction are respectively compared with the second threshold value th_b which is set for line defect detection, and the image for defect extraction is binarized on the basis of the results of comparison. The respective pixels of the image for defect extraction are thereby classified into line defect candidate pixels and pixels other than those (see step 108 in FIG. 4). Then, by referring to the results of binarization per line of the image for defect extraction, lines, at which the proportion of pixels which were classified as line defect candidate pixels by the binarization is greater than or equal to a given value (R_b %), are determined to be line defects. Storage, as defective pixels corresponding to a line defect, of all of the pixels of a line determined to be a line defect is carried out for all of the lines (see step 110 of FIG. 4).

As described above, the second threshold value th_b for line defect detection is set to be a value which is lower than the first threshold value th_a for point defect detection, in consideration of the fact that line defects are easy to recognize visually. Therefore, by using the second threshold value th_b, a larger number of pixels are extracted as line defect candidate pixels than the aforementioned point defect candidate pixels. Accordingly, even if, among the line defects which exist in the image for defect extraction, there are included line defects which were not detected in the above-described point defect detection, they can be reliably detected as line defects in this line defect detection. Further, because the second threshold value th_b is set to be a value which is smaller than the first threshold value th_a, there is a high possibility that pixels, at which merely noise is superimposed, will also be included in with the line defect candidate pixels which were extracted previously. Therefore, in step 110, the line defect candidate pixels which remain after the judgment of the line defects (the line defect candidate pixels which are positioned on lines which were not determined to be line defects), are excluded from the defective pixels. In this way, in the image for defect extraction, pixels at which merely noise is superimposed can be prevented from being mistakenly determined as defective pixels.

When the point defect detection processing and the line defect detection processing are respectively completed as described above, the results of detection of the point defects and the results of detection of the line defects are merged (the pixels determined to be defective pixels by at least either of the detection processings are all made to be defective pixels), and defective pixel information is generated. Then, the generated defective pixel information is stored in the storage section 50A (see step 112 of FIG. 4), and the defective pixel detection processing ends. By generating and storing the defective pixel information as described above, defective pixel correction on the image data, which includes the image information and is read-out from the radiographic image detector 20 by the image read-out section 68, can be carried out with high accuracy.

Figure 5:
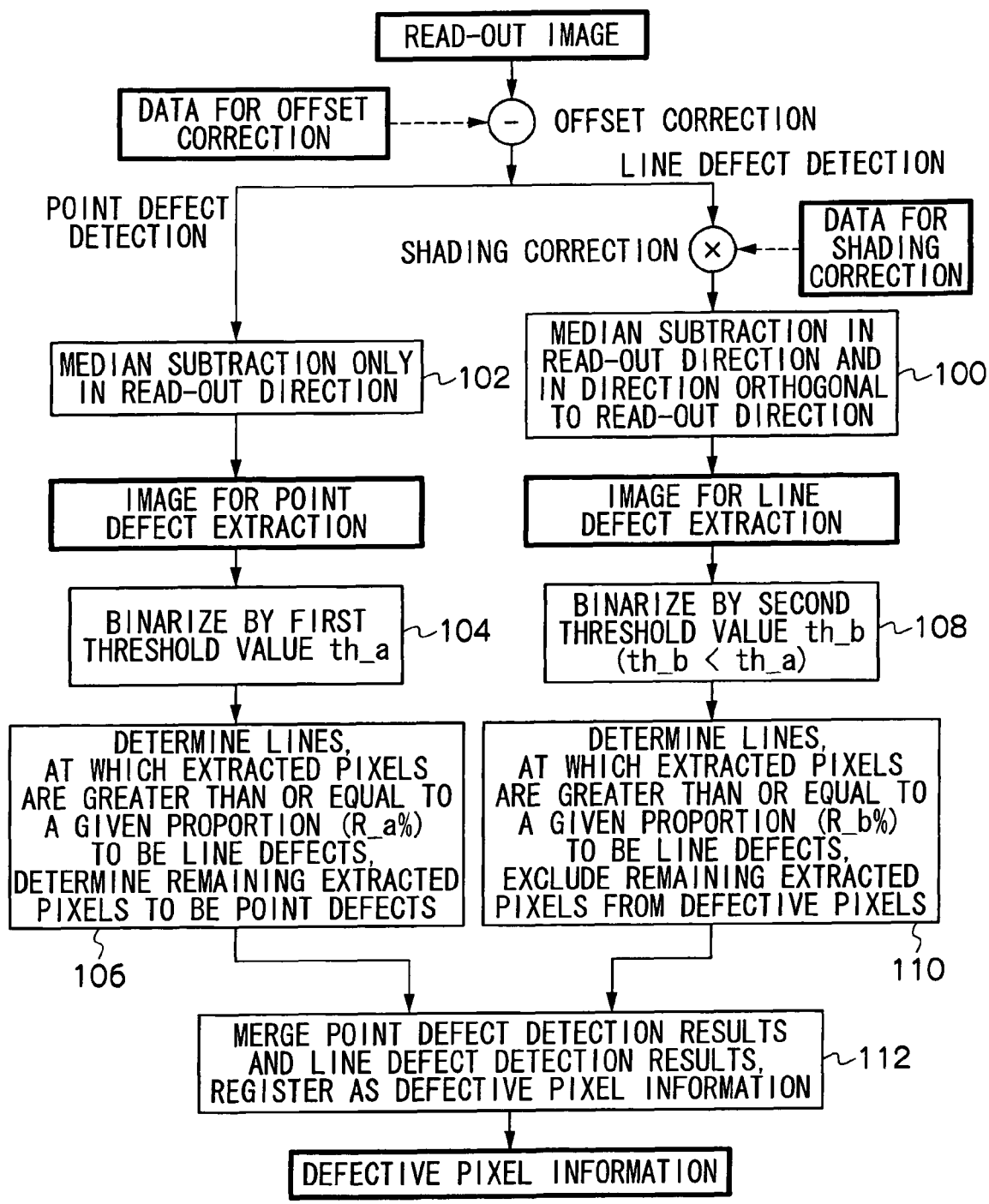
FIG. 5 is a schematic drawing showing another embodiment of pixel defect detection processing.

Note that the defective pixel detection processing is not limited to the processing shown in FIG. 4, and the defective pixel detection processing shown in FIG. 5 may be carried out instead of the defective pixels detection processing shown in FIG. 4. In the defective pixel detection processing shown in FIG. 4, the image (the image for defect extraction), which is obtained by performing offset correction, shading correction, and median subtraction in the read-out direction and in the direction orthogonal thereto on the image data read-out from the radiographic image detector 20 by the image read-out section 68, is used respectively in detecting point defects and in detecting line defects. However, the defective pixel detection processing shown in FIG. 5 differs from that of FIG. 4 with respect to the point that, in the processing of FIG. 5, an image which has undergone the same processings as in FIG. 4 is used in detecting line defects, whereas, in detecting point defects, there is used an image (image for point defect extraction) which is obtained by subjecting the image data, which is read-out from the radiographic image detector 20 by the image read-out section 68, to offset correction and to median subtraction only with respect to the read-out direction (see step 102 of FIG. 5).

In a case in which shading correction is carried out on an image which includes point defects (an image in which changes in luminance or the like corresponding to point defects have arisen), there is a high possibility that, in detecting the point defects, the range of a point defect (the range in which a change in luminance or the like corresponding to a point defect has arisen) will be mistakenly detected due to a variation in the shape of the pattern of the luminance change or the like which corresponds to the point defect. In contrast, in the defective pixel detection processing shown in FIG. 5, shading correction is carried out only on the image which used in detecting line defects, and shading correction is not carried out on the image which is used in detecting point defects. Therefore, it is possible to prevent the range of a point defect from being mistakenly detected in the point defect detection processing. Further, in the line defect detection processing which is easily affected by noise, due to use of the smaller second threshold value th_b, it is possible to prevent noise which is superimposed on the image from being mistakenly detected as a line defect. Accordingly, the accuracy of detecting point defects and line defects can be improved.

Further, there are many cases in which, at a radiographic image detector which is structured such that an image is read-out via linear electrodes which are arrayed in a stripe-like manner (the second transparent linear electrodes 38B) as is the case with the radiographic image detector 20 relating to the exemplary embodiments, a noise component in which the luminance or the like fluctuates periodically along a direction intersecting the read-out direction (i.e., a stripe-like luminance pattern) is superimposed over the entire surface of the read-out image. This occurs for reasons such as, for example, the reference values for read-out of the individual linear electrodes are offset. In regard thereto, in the defective pixel detection processing shown in FIG. 5, median subtraction is carried out, only with respect to the read-out direction, on the image which is used in detecting point defects. Therefore, the aforementioned noise component which fluctuates periodically can be removed from the image for point defect extraction. On the other hand, due to median subtraction not being carried out with respect to the direction orthogonal to the read-out direction, combined with shading correction not being carried out as described above, changes in luminance which should be detected as point defects are preserved in the image for point defect extraction. By performing detection of point defects by using the image for point defect extraction in this way, the accuracy of detecting point defects can be improved.

After shading correction is carried out on the image for detecting line defects, median subtraction with respect to the read-out direction and the direction orthogonal thereto are carried out. Therefore, in the line defect detection processing which is easily affected by noise, due to use of the smaller second threshold value th_b, the noise which is superimposed on the image (the noise component which fluctuates periodically, (i.e., the stripe-like luminance pattern) and the dispersion in luminance which could not be completely corrected in the shading correction (also called in-plane locality)) can be prevented from being mistakenly detected as line defects. Accordingly, the accuracy of detecting point defects and line defects can be further improved.

Further, the defective pixel detection processing is not limited to the processings shown in FIG. 4 and FIG. 5. For example, the defective pixel detection processing shown in FIG. 6 may be carried out instead of the defective pixel detection processings shown in FIG. 4 and FIG. 5. The defective pixel detection processing shown in FIG. 6 differs from FIG. 5 with regard to the point that, in the processing of FIG. 6, an image which has undergone the same processings as in FIG. 4 and FIG. 5 is used in detecting line defects, whereas, in detecting point defects, there is used an image (image for point defect extraction) which is obtained by subjecting the image data, which is read-out from the radiographic image detector 20 by the image read-out section 68, to median subtraction only with respect to the read-out direction while omitting the offset correction as well. Also in the case of performing the defective pixel detection processing shown in FIG. 6, point defects and line defects can be detected with high accuracy, in the same way as in the defective pixel detection processing shown in FIG. 5.

In a case in which pixels, whose dark outputs differ greatly from those of other pixels, exist at the radiographic image detector 20, if offset correction is applied, the differences in the dark outputs between these pixels and the other pixels can be corrected, but, depending on the photographing conditions at the time of image capture and the like, there is a high possibility that these pixels are pixels at which there has arisen an abnormality in the output value (the luminance or the like) which cannot be completely corrected even by the shading correction, i.e., are defective pixels. With respect thereto, in the defective pixel detection processing shown in FIG. 6, an image for which offset correction also is omitted is used as the image for point defect extraction. Therefore, pixels, whose dark outputs differ greatly from those of other pixels and which have a high possibility of being defective pixels, also can be detected as point defects, and the accuracy of detecting point defects can be improved even further.

Further, although description has been given above by using the optical-reading-type radiographic image detector 20 as an example of the image pickup element, the present invention is not limited to the same. For example, the image pickup element may be a radiographic image detector of another structure, such as a TFT-type, or may be another image pickup element such as a CCD.

Moreover, although the above describes an aspect in which the image processing program relating to the exemplary embodiment is stored in advance (installed) in the storage section 50A, the present invention is not limited to the same. The image processing program can also be provided, for example, in a form of being recorded on a recording medium such as a CD-ROM, a DVD-ROM.

As described above, the embodiment of the present invention carries out correction of defective pixels on an image captured by an image pickup element, on the basis of defective pixel information stored in a storage section, and detects point defects on the basis of a first image for defect detection, which is obtained by the image pickup element and has not been subjected to defective pixel correction, and in accordance with point defect detecting conditions for detecting point defects. Further, the embodiment detects line defects on the basis of a second image for defect detection, which is obtained by the image pickup element and has not been subjected to defective pixel correction, and in accordance with line defect detecting conditions for detecting line defects, and stores results of detection of line defects and results of detection of point defects in the storage section as the defective pixel information. Therefore, point defects and line defects of the image pickup element can be detected and corrected accurately and in a short period of time.

What is claimed is:

1. An image processing device comprising:
a storage section that stores defective pixel information expressing defective pixels of an image pickup element;
a correction section that, on the basis of the defective pixel information, performs correction of defective pixels on an image captured by the image pickup element;
a point defect detector that, on the basis of a first image for defect detection which is obtained through image capture by the image pickup element and which has not been subjected to defective pixel correction, detects point defects of the image pickup element in accordance with point defect detecting conditions for detecting point defects which are formed by a single or a small number of defective pixels being distributed in dot form;
a line defect detector that, on the basis of a second image for defect detection which is obtained through image capture by the image pickup element and which has not been subjected to defective pixel correction, detects line defects of the image pickup element in accordance with line defect detecting conditions for detecting line defects which are formed by a plurality of defective pixels being distributed rectilinearly;
wherein point defect detection on the basis of the first image for defect detection is independent of line defect detection on the basis of the second image for defect detection; and
a defective pixel information register that stores results of detection of the point defects and results of detection of the line defects in the storage section as the defective pixel information.

2. The image processing device of claim 1, wherein the image pickup element comprises a radiographic image detector including a photoelectric converting layer which is sensitive to radiation, and an image that is captured by the radiographic image detector comprises an image expressing a spatial distribution of radiation incident on the radiographic image detector.

3. The image processing device of claim 1, wherein
the point defect detector extracts, from the first image for defect detection and as point defect candidate pixels, pixels having a value greater than or equal to a first threshold value, or pixels having a value that differs from a value of another pixel by an amount greater than or equal to the first threshold value, and thereafter, detects, as line defects, lines at which a proportion of the extracted point defect candidate pixels among all pixels of the line is greater than or equal to a predetermined value, and detects, as point defects, pixels that do not correspond to the line defects among the extracted point defect candidate pixels, and
the line defect detector extracts, from the second image for defect detection and as line defect candidate pixels, pixels having a value greater than or equal to a second threshold value, or pixels having a value that differs from a value of a another pixel by an amount greater than or equal to the second threshold value, the second threshold value being smaller than the first threshold value, and thereafter, detects, as line defects, lines at which a proportion of the extracted line defect candidate pixels among all pixels of the line is greater than or equal to a predetermined value, and excludes, from defective pixels, pixels which do not correspond to line defects among the extracted line defect candidate pixels.

4. The image processing device of claim 3, wherein
the second image comprises an image obtained by performing at least shading correction, which corrects dispersion in respective sensitivities of individual pixels of the image pickup element, on a read-out image that is read out from the image pickup element, and
the first image comprises an image obtained by not performing the shading correction on the read-out image.

5. The image processing device of claim 4, wherein
the second image comprises an image obtained by further performing offset correction, which corrects dispersion in respective dark outputs of the individual pixels of the image pickup element, on the read-out image, and
the first image comprises an image obtained by not performing the offset correction on the read-out image.

6. The image processing device of claim 4, wherein
the image pickup element comprises a radiographic image detector which includes a photoelectric converting layer sensitive to radiation, and from which an image is read out via a plurality of electrodes for read-out which respectively extend along a read-out direction of an image and are arrayed along a direction intersecting the read-out direction, the second image comprises an image obtained by performing, on the read-out image and with respect to both the read-out direction and a direction intersecting the read-out direction, median subtraction which subtracts an image for correction obtained by applying a median filter of a predetermined direction to the read-out image, and
the first image comprises an image obtained by performing the median subtraction on the read-out image only with respect to the read-out direction.

7. An image processing method comprising:
detecting point defects of an image pickup element on the basis of a first image for defect detection, which is obtained through image capture by the image pickup element and which has not been subjected to defective pixel correction, and in accordance with point defect detecting conditions for detecting point defects which are formed by a single or a small number of defective pixels being distributed in dot form;

detecting line defects of the image pickup element on the basis of a second image for defect detection, which is obtained through image capture by the image pickup element and which has not been subjected to defective pixel correction, and in accordance with line defect detecting conditions for detecting line defects which are formed by a plurality of defective pixels being distributed rectilinearly;

wherein detecting point defects on the basis of the first image for defect detection is performed independent of detecting line defects on the basis of the second image for defect detection;

storing results of detection of the point defects and results of detection of the line defects in a storage section as defective pixel information; and performing correction of defective pixels on an image captured by the image pickup element, on the basis of the defective pixel information stored in the storage section.

8. The image processing method of claim 7, wherein the image pickup element comprises a radiographic image detector including a photoelectric converting layer which is sensitive to radiation, and an image that is captured by the radiographic image detector comprises an image expressing a spatial distribution of radiation incident on the radiographic image detector.

9. The image processing method of claim 7, wherein detecting of point defects comprises extracting, from the first image for defect detection and as point defect candidate pixels, pixels having a value greater than or equal to a first threshold value, or pixels having a value that differs from a value of another pixel by an amount greater than or equal to the first threshold value, thereafter detecting, as line defects, lines at which a proportion of the extracted point defect candidate pixels among all pixels of the line is greater than or equal to a predetermined value, and detecting, as point defects, pixels that do not correspond to the line defects among the extracted point defect candidate pixels, and detecting of line defects comprises extracting, from the second image for defect detection and as line defect candidate pixels, pixels having a value greater than or equal to a second threshold value, or pixels having a value that differs from a value of a another pixel by an amount greater than or equal to the second threshold value, the second threshold value being smaller than the first threshold value, thereafter detecting, as line defects, lines at which a proportion of the extracted line defect candidate pixels among all pixels of the line is greater than or equal to a predetermined value, and excluding, from defective pixels, pixels which do not correspond to line defects among the extracted line defect candidate pixels.

10. The image processing method of claim 9, wherein the second image comprises an image obtained by performing at least shading correction, which corrects dispersion in respective sensitivities of individual pixels of the image pickup element, on a read-out image that is read out from the image pickup element, and the first image comprises an image obtained by not performing the shading correction on the read-out image.

11. The image processing method of claim 10, wherein the second image comprises an image obtained by further performing offset correction, which corrects dispersion in respective dark outputs of the individual pixels of the image pickup element, on the read-out image, and the first image comprises an image obtained by not performing the offset correction on the read-out image.

12. The image processing method of claim 10, wherein the image pickup element comprises a radiographic image detector which includes a photoelectric converting layer sensitive to radiation, and from which an image is read out via a plurality of electrodes for read-out which respectively extend along a read-out direction of an image and are arrayed along a direction intersecting the read-out direction, the second image comprises an image obtained by performing, on the read-out image and with respect to both the read-out direction and a direction intersecting the read-out direction, median subtraction which subtracts an image for correction obtained by applying a median filter of a predetermined direction to the read-out image, and the first image comprises an image obtained by performing the median subtraction on the read-out image only with respect to the read-out direction.

13. A non-transitory computer readable storage medium storing a program causing a computer comprising a storage section for storing defective pixel information expressing defective pixels of an image pickup element, to execute an image processing, the image processing comprising:

detecting point defects of the image pickup element on the basis of a first image for defect detection, which is obtained through image capture by the image pickup element and which has not been subjected to defective pixel correction, and in accordance with point defect detecting conditions for detecting point defects which are formed by a single or a small number of defective pixels being distributed in dot form;

detecting line defects of the image pickup element on the basis of a second image for defect detection, which is obtained through image capture by the image pickup element and which has not been subjected to defective pixel correction, and in accordance with line defect detecting conditions for detecting line defects which are formed by a plurality of defective pixels being distributed rectilinearly; storing results of detection of the point defects and results of detection of the line defects in the storage section as the defective pixel information;

wherein detecting point defects on the basis of the first image for defect detection is performed independent of detecting line defects on the basis of the second image for defect detection; and performing correction of defective pixels on an image picked up by the image pickup element, on the basis of the defective pixel information stored in the storage section.

* * * * *